US012270375B2

(12) United States Patent
Baun (10) Patent No.: US 12,270,375 B2
(45) Date of Patent: Apr. 8, 2025

(54) WIND TURBINE GENERATOR WITH SERVICE PLATFORM AND ASSOCIATED METHOD (71) Applicant: Vestas Wind Systems A/S, Aarhus N (DK)

(72) Inventor: Torben Ladegaard Baun, Skødstrup (DK)

(73) Assignee: Vestas Wind Systems A/S, Aarhus N. (DK)

(*) Notice: Subject to any disclaimer, the term of this patent is extended or adjusted under 35 U.S.C. 154(b) by 87 days.

(21) Appl. No.: 17/784,210

(22) PCT Filed: Dec. 21, 2020

(86) PCT No.: PCT/DK2020/050399
§ 371 (c)(1),
(2) Date: Jun. 10, 2022

(87) PCT Pub. No.: WO2021/136570
PCT Pub. Date: Jul. 8, 2021

(65) Prior Publication Data
US 2023/0059355 A1 Feb. 23, 2023

(30) Foreign Application Priority Data
Dec. 30, 2019 (DK) .................. 2019 70842

(51) Int. Cl.
F03D 13/40 (2016.01)
B66C 23/20 (2006.01)
(Continued)

(52) U.S. Cl.
CPC ............ F03D 13/40 (2016.05); B66C 23/207 (2013.01); E04G 3/20 (2013.01); F03D 1/06 (2013.01);
(Continued)

(58) Field of Classification Search
CPC .......... F03D 13/40; F03D 1/101; F03D 1/125; F03D 1/141; F03D 1/188; F03D 13/116;
(Continued)

(56) References Cited

U.S. PATENT DOCUMENTS 3,804,268 A * 4/1974 Barron .................. B66D 1/48
414/139.6
7,775,753 B2 8/2010 Pedersen
(Continued)

FOREIGN PATENT DOCUMENTS

AU 2012216676 A1 3/2013
DE 20205396 U1 11/2002
(Continued)

OTHER PUBLICATIONS

Danish Patent and Trademark Office, Search and Examination Report in PA 2019 70842, Jun. 18, 2020.
(Continued)

Primary Examiner — Wesley G Harris
(74) Attorney, Agent, or Firm — Wood Herron & Evans LLP (57) ABSTRACT A wind turbine generator nacelle (14) comprises a nacelle frame (44) having a first forward hub end and a second aft end. Dedicated transport fittings (46) are positioned at each of the ends of the nacelle frame (44). The fittings (46) are adapted to be engaged by transport frames (86) on first and second transport trailers (80) for supporting the nacelle frame (44) for transport by the trailers (80). A service platform (20) is mounted to the transport fittings (46) on the aft end of the nacelle frame (44) such that the service platform (20) is cantilevered off of the aft end of the nacelle frame (44).

13 Claims, 8 Drawing Sheets (51) Int. Cl.
*E04G 3/20* (2006.01)
*F03D 1/06* (2006.01)

(52) U.S. Cl.
CPC ..... *F05B 2240/14* (2013.01); *F05B 2240/916* (2013.01); *F05B 2260/02* (2013.01); *Y02E 10/72* (2013.01); *Y02E 10/728* (2013.01)

(58) Field of Classification Search
CPC .... F03D 13/135; F03D 13/139; F03D 13/403; F03D 1/00; F03D 13/10; F03D 80/00; F03D 80/50; F03D 13/20; B66C 23/207; E04G 3/20; F05B 2240/14; F05B 2260/02; F05B 2230/61; F05B 2240/142; F05B 2240/916; B60P 3/40; Y02E 10/72; Y02P 70/50
See application file for complete search history.

(56) References Cited

U.S. PATENT DOCUMENTS

| | | | |
|---|---|---|---|
| 9,103,319 B2 | 8/2015 | Kirt et al. | |
| 9,203,257 B1* | 12/2015 | Zaman | H02J 7/0068 |
| 9,359,911 B2* | 6/2016 | Abolfazlian | F01D 25/12 |
| 2007/0145181 A1* | 6/2007 | Pedersen | B66F 9/065 |
| | | | 244/16 |
| 2007/0200103 A1* | 8/2007 | Viladomiu i Guarro | B66C 23/207 |
| | | | 254/334 |
| 2008/0266758 A1* | 10/2008 | Hurt | F03D 9/11 |
| | | | 361/625 |
| 2010/0139069 A1* | 6/2010 | Daniels | F03D 80/00 |
| | | | 29/402.01 |
| 2011/0097202 A1* | 4/2011 | de Buhr | F03D 80/00 |
| | | | 29/700 |
| 2019/0203700 A1* | 7/2019 | Numajiri | B66C 23/185 |

FOREIGN PATENT DOCUMENTS

| | | | | |
|---|---|---|---|---|
| DE | 102013101239 A1 | | 8/2014 | |
| EP | 3372824 A1 * | | 9/2018 | ............. F03D 80/00 |
| WO | 20120130243 A2 | | 10/2012 | |
| WO | WO-2012130243 A2 * | | 10/2012 | ............... F03D 1/04 |
| WO | WO-2016164934 A1 * | | 10/2016 | ............ F03B 13/264 |
| WO | 2019042510 A1 | | 3/2019 | |

OTHER PUBLICATIONS

European Patent Office, International Search Report and Written Opinion in PCT Application No. PCT/DK2020/050399, Mar. 31, 2021.

* cited by examiner

WIND TURBINE GENERATOR WITH SERVICE PLATFORM AND ASSOCIATED METHOD

TECHNICAL FIELD

This invention relates generally to wind turbines, and more particularly to service platforms for wind turbines.

BACKGROUND

Wind turbine generators are used to produce electrical energy using a renewable resource and without combusting a fossil fuel. A wind turbine generator converts kinetic energy from the wind into electrical energy, and includes a tower, a nacelle mounted atop the tower, a rotor hub rotatably supported by the nacelle, and a plurality of rotor blades attached to the hub. The hub is coupled to a generator housed inside the nacelle. Consequently, as wind forces the blades to rotate, electrical energy is produced by the generator.

One method of transporting the nacelle to a desired installation site involves the use of a so-called "world adapter transport solution". Such a transport solution is the subject of the assignee's U.S. Pat. No. 7,775,753. This transport solution mounts a removable transport interface frame to each of the forward and aft ends of the nacelle. The nacelle is supported between a first forward trailer and a second aft trailer. The first trailer includes a transport frame at its aft end which engages with the transport interface frame on the forward end of the nacelle, and the second trailer includes a transport frame on its forward end which engages with the transport interface frame on the aft end of the nacelle. The first trailer is towed by a towing vehicle. Once the transport frames are engaged with the transport interface frames, lifting elements associated with the transport frames lift the nacelle up off the ground for transport. Upon delivery to the installation site the lifting elements then lower the nacelle to the ground. Alternatively, the nacelle can be lifted and lowered by lifting and lowering the suspension systems of the two trailers.

One method of positioning the generator and associated equipment such as the gearbox, as well as personnel, into the nacelle involves the use of an air ship to lower the payload through a hatch in the top of the nacelle. Such a method is disclosed in the assignee's U.S. Pat. No. 9,103,319, hereby incorporated by reference herein as if fully set forth in its entirety. Personnel or service equipment may be lowered to the nacelle using e.g. an airship or helicopter or drone or other aerial means.

Further improvements in the delivery of equipment and personnel to the nacelle mounted atop the tower are desired.

SUMMARY

In an exemplary embodiment, a wind turbine generator nacelle includes a nacelle frame having a first forward hub end and a second aft end, dedicated transport fittings at each of the ends of the nacelle frame, the fittings adapted to be engaged by transport frames on first and second transport trailers for supporting the nacelle frame for transport by the trailers, and a service platform mounted to the transport fittings on the aft end of the nacelle frame such that the service platform is cantilevered off of the aft end of the nacelle frame.

In one aspect, the nacelle can have an internal service floor and the service platform can be substantially coplanar with the internal service floor, thereby facilitating movement of equipment from the service platform to the interior of the nacelle. The service platform floor may be generally L-shaped having a leg portion and a foot portion, the leg portion abutting a rear wall of the nacelle and the foot portion spaced away from the rear wall of the nacelle. The rear wall of the nacelle can have an access door therein positioned to communicate between the leg portion of the service platform and the internal service floor of the nacelle. In a further aspect of the present invention, the nacelle can further include a hoist configured to extend through the access door out of the nacelle and configured to be slewed so as to be capable of transferring loads horizontally from the service platform to the nacelle and vertically from a support surface (e.g., the ground, deck of a ship, or a service platform adjacent a lower end of the tower) upwardly between the foot portion of the service platform and the rear wall of the nacelle. In an alternative embodiment, the rear wall of the nacelle can have an access door therein positioned to communicate between the service platform and the internal service floor of the nacelle and wherein the service platform functions as an emergency evacuation platform. Moreover, the rear wall of the nacelle can also have an electrical outlet accessible from the service platform. In this way, lights and other elements requiring electrical power may be used with the service platform.

In another exemplary embodiment, a method of transporting a wind turbine generator nacelle to an installation site and configuring it for use at the installation site includes providing a nacelle frame having a first forward hub end and a second aft end, providing dedicated transport fittings at each of the ends of the nacelle frame, engaging the transport fittings on the forward end of the nacelle frame with a first transport frame on a first transport trailer and engaging the transport fittings on the aft end of the nacelle frame with a second transport frame on a second transport trailer, supporting the nacelle frame above the ground with the first and second transport trailers, transporting the nacelle frame to the installation site with the first and second transport trailers, removing the nacelle frame from the first and second transport trailers, and mounting a service platform to the transport fittings on the aft end of the nacelle frame such that the service platform is cantilevered off of the aft end of the nacelle frame.

In yet another embodiment, a wind turbine generator includes a tower, a nacelle mounted atop the tower, the nacelle having a first forward hub end and a second aft end, a rotor hub rotatably supported by the nacelle on the forward end, a plurality of rotor blades mounted to the hub, dedicated transport fittings at each of the ends of the nacelle, the fittings adapted to be engaged by transport frames on first and second transport trailers for supporting the nacelle for transport by the trailers, and a service platform mounted to the transport fittings on the aft end of the nacelle such that the service platform is cantilevered off of the aft end of the nacelle.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
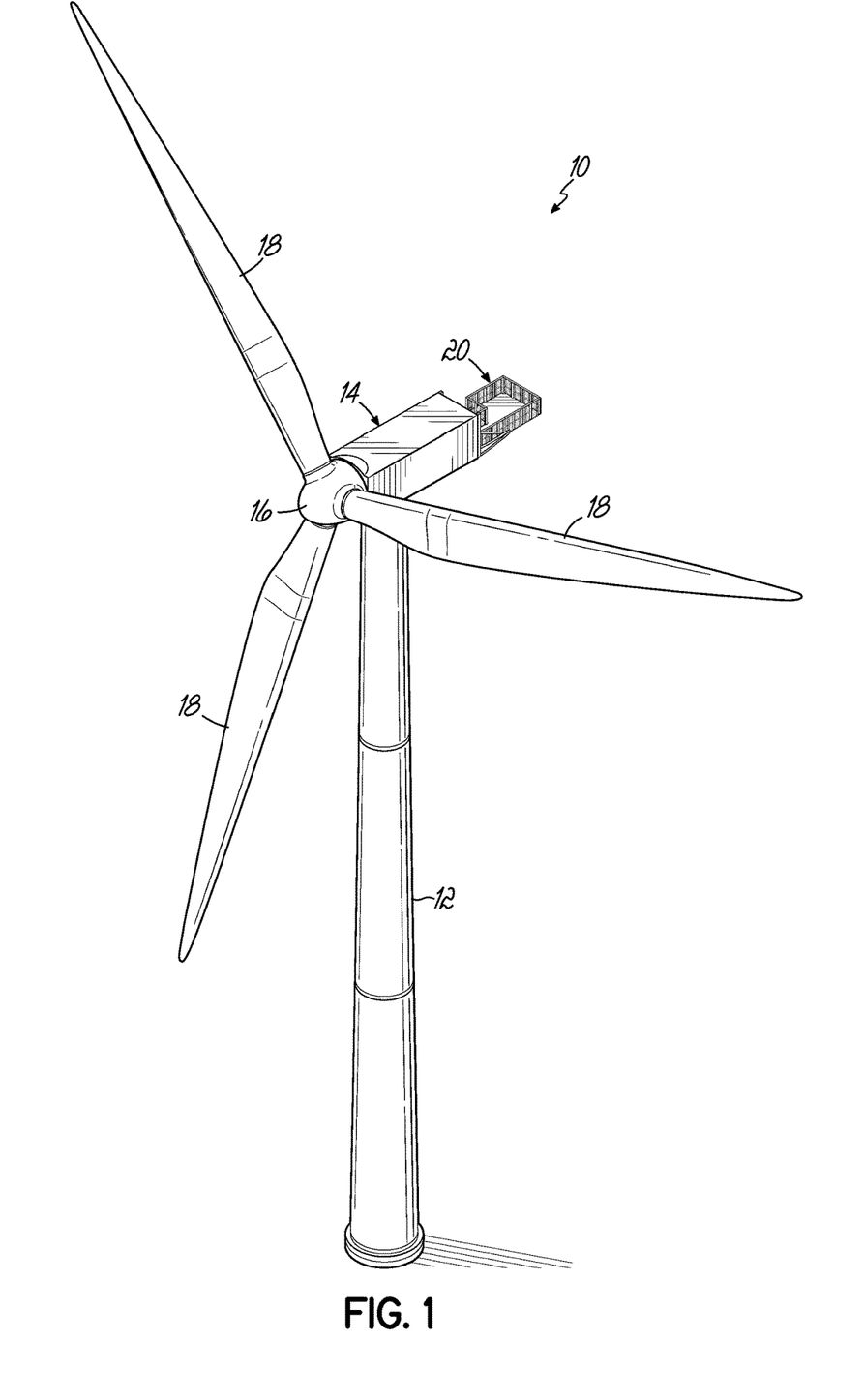
FIG. 1 is a front perspective view of a wind turbine generator according to the principles of the present invention.
Figure 2:
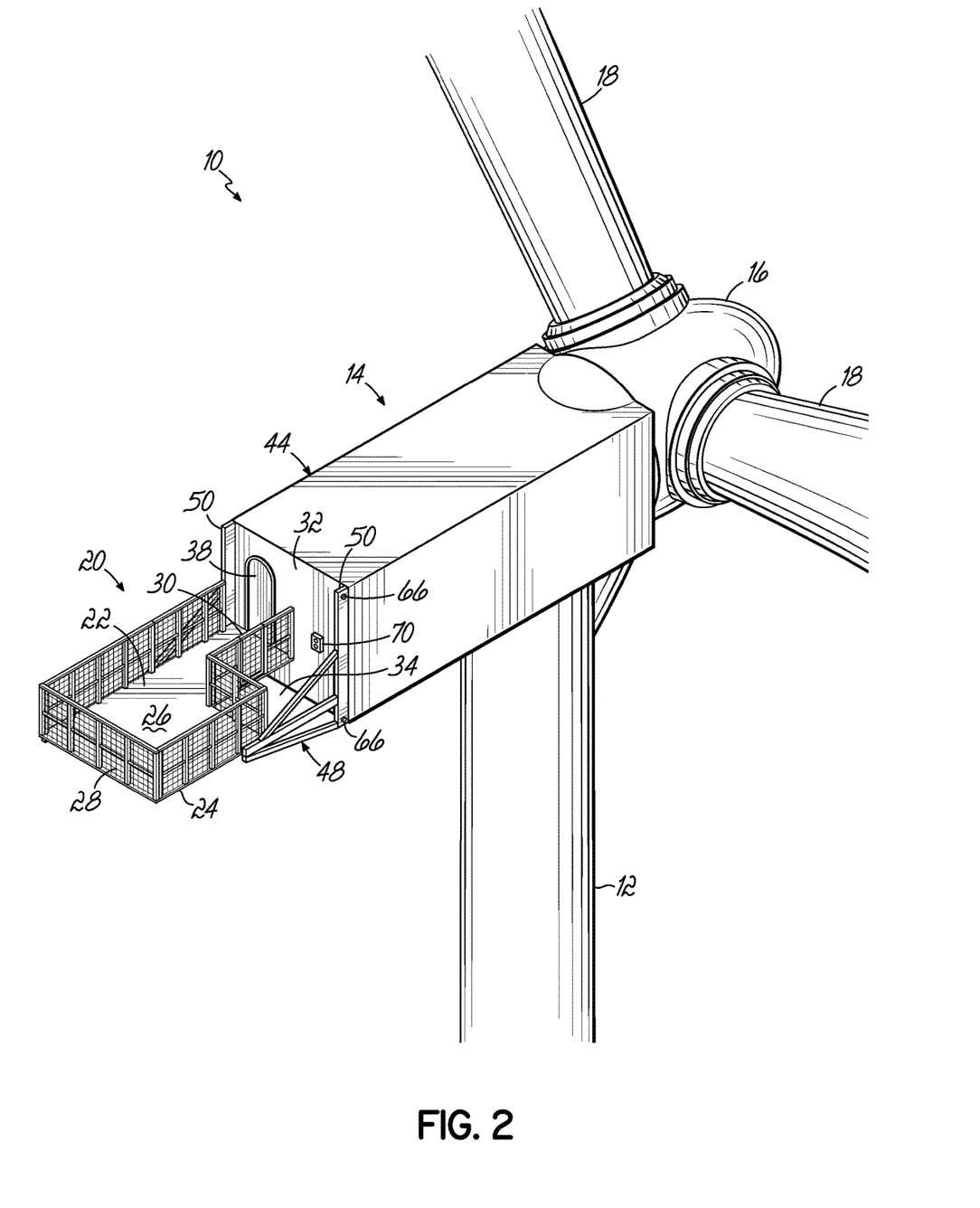
FIG. 2 is a rear perspective view, enlarged, of the nacelle and rotor hub of the wind turbine generator of FIG. 1.

Referring to FIG. 1, a wind turbine generator 10 includes a tower 12, a nacelle 14 mounted atop the tower 12, a rotor hub 16 rotatably supported by the nacelle 14, and a plurality of rotor blades 18 mounted to the hub 16. The hub 16 is operatively coupled to a generator (not shown) housed inside the nacelle 14. In addition to the generator, the nacelle 14 also houses other components required for converting wind energy into electrical energy such as a gearbox, a transformer, a main shaft, a main shaft bearing, etc. (not shown).

Referring to FIGS. 1, 2, 4A, and 4B, a service platform 20, sometimes referred to as a "helihoist", is cantilevered off the aft end of the nacelle 14. The floor 26 of the service platform 20 may be generally L-shaped, when seen from above, having a leg portion 22 and a foot portion 24. The service platform 20 may have a mesh floor 26. It may have a mesh railing 28 extending around the periphery of the service platform 20, preferably, around its entire periphery. A gate 30 may be included in the mesh railing 28, preferably adjacent a rear wall 32 of the nacelle 14. The gate 30 may face an open area 34 between the foot portion 24 of the service platform 20 and the rear wall 32 of the nacelle 14. The gate may serve one or more purpose to be described below. The rear wall 32 of the nacelle 14 preferably has an access door 38 providing a means of ingress and egress to the nacelle 14 for workers and equipment, especially between the nacelle 14 and the platform 20. The nacelle 14 has an internal service floor 40 (e.g., see FIGS. 4A and 4B) that is preferably approximately coplanar with the floor 26 of the service platform 20, to facilitate such ingress and egress.

Figure 4A:
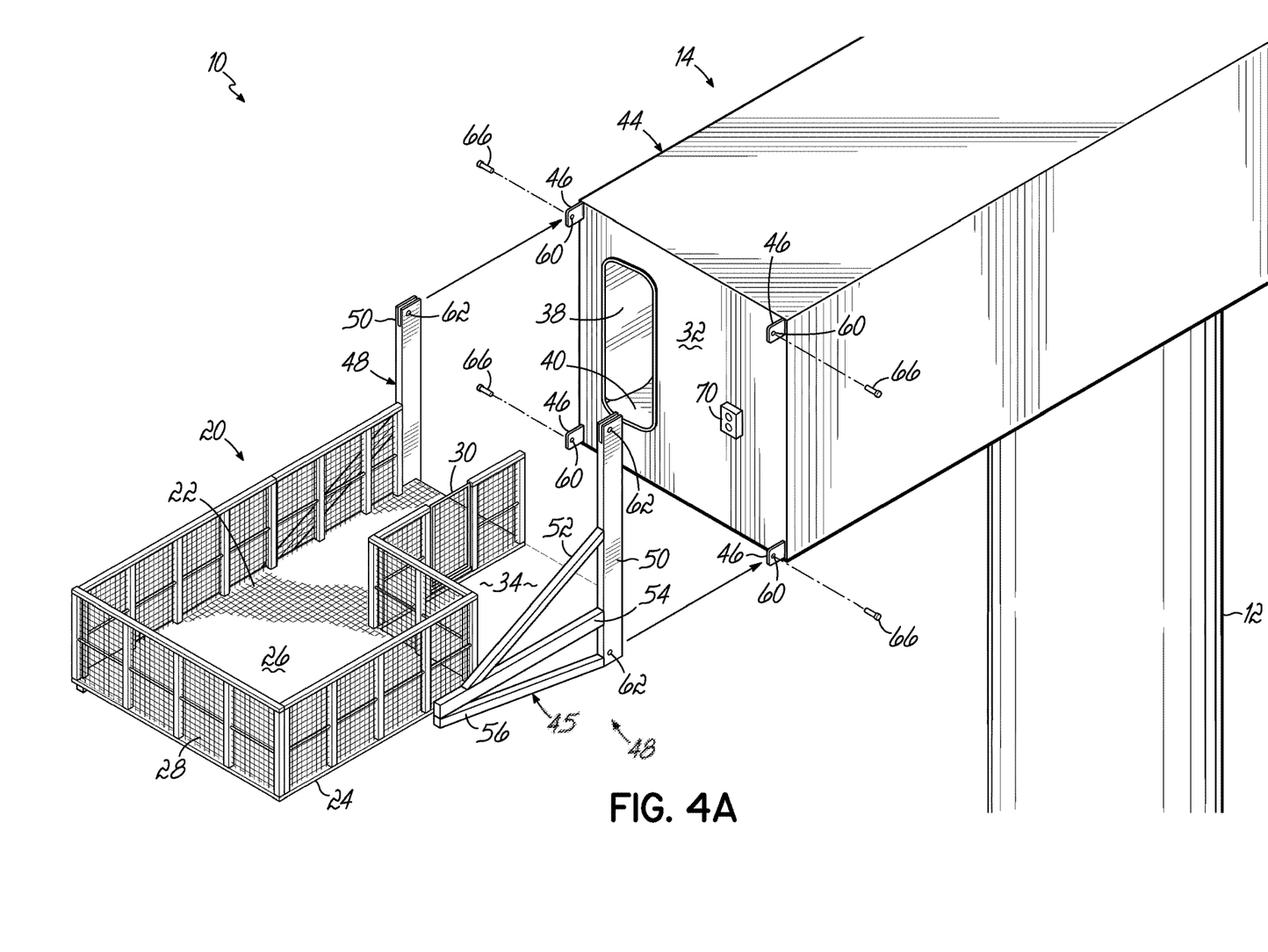
FIG. 4A is a view similar to FIG. 2 but enlarged and exploded.
Figure 4B:
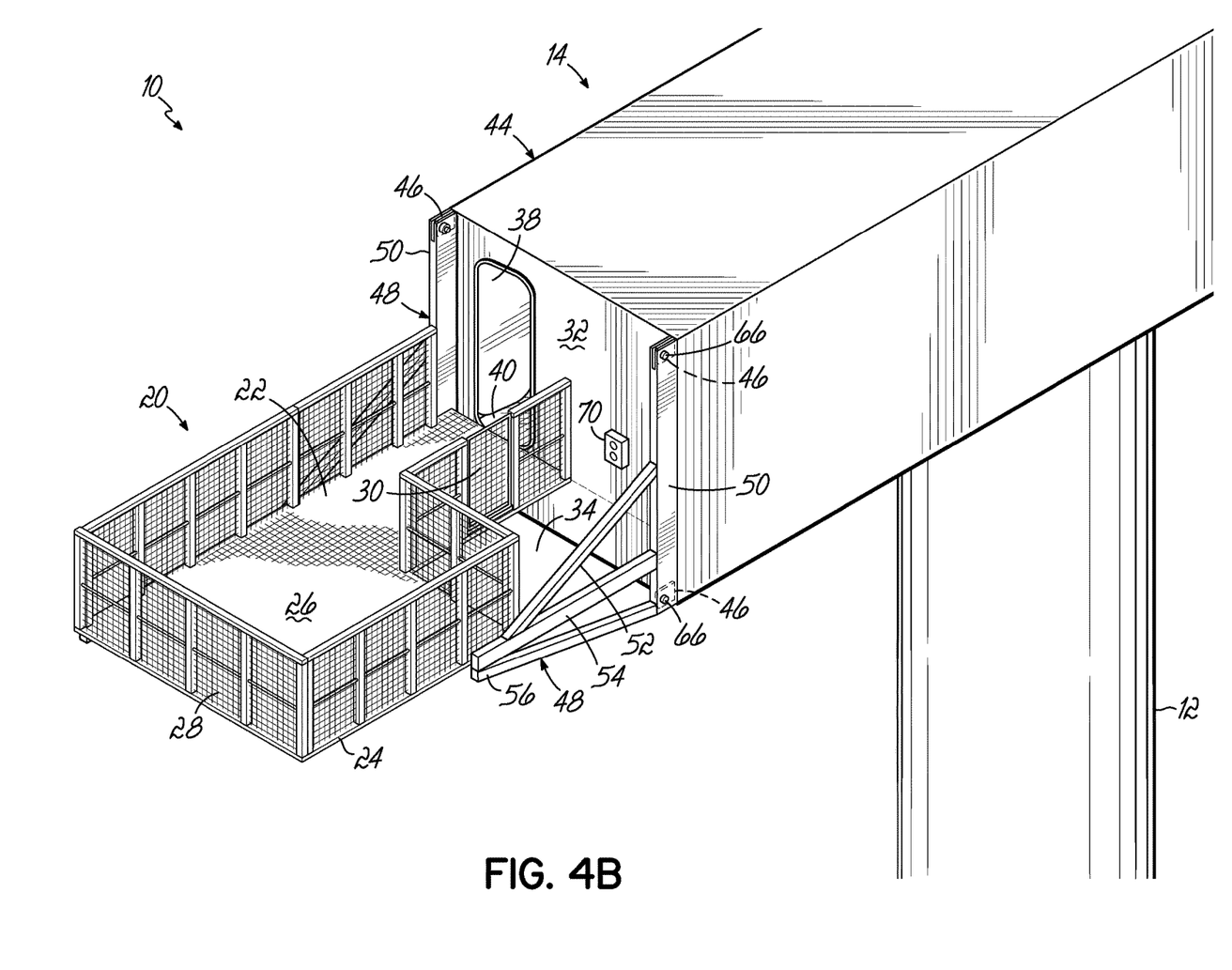
FIG. 4B is a view similar to FIG. 4A but assembled.

The nacelle 14 has a frame 44 (either an exoskeleton frame or an endoskeleton frame) that includes dedicated transport fittings 46, for example tangs, ears, or lugs, on the aft end of the nacelle 14. The transport fittings 46 shown in the drawings are shown by way of example in the form tangs 46. The service platform 20 has a pair of trusses 48, one on each lateral side of the forward end of the service platform 20. Each truss 48 may comprise a generally upright post 50 and a lateral arm 45. Preferably, the trusses 48 may have a generally upright L-shape when seen from the side. The trusses 48 connect the platform 20 to the nacelle 14. The trusses 48 thereby support the platform 20. When connected to the nacelle 14, the arms 45 of the L-shaped trusses 48 protrude in a direction away from the nacelle 14. The platform 20 is thereby supported aft of the nacelle 14 in such a way that it forms an extension of the nacelle 14 in a direction of the length of the nacelle 14, i.e. in what corresponds to the wind direction. Each truss 48 preferably has an upright post 50 and a transverse arm 45 which may comprise one or more generally lateral struts 52, 54, 56. An upright post 50 may be a vertical post 50. An arm 45 may be a generally horizontal arm 45 although one or more struts 52, 54, 56 may extend in a direction which defines an elevation angle to the arm 45. Alternatively or additionally, one or more struts 52, 54, 56 may extend in a direction which defines an declination angle to the arm 45. As illustrated, one strut 52 defines an elevation angle to the arm 45 while another strut 56 defines a declination angle to the arm 45. Still another strut 54 defines a generally horizontal direction of the arm 45. The floor 26 of the service platform 20 is predominantly supported on the arm, i.e. on said one or more lateral struts 52, 54, 56. The lateral arm of each truss 48 in turn is supported on an upright post 50. As illustrated, the struts 52, 54, 56 of a lateral arm of each truss 48 are supported on an upright post 50. Preferably, the platform floor 26 is thereby supported between a pair of trusses 48. Optionally, a support beam (not shown) may extend between two trusses 48. For example, a support beam may extend between the respective lateral arms of two trusses 48. Such a support beam may extend between one or more of the respective lateral struts 52, 54, 56 of two trusses 48. Such a support beam may extend between the respective lateral arms of two trusses 48 and beneath the platform floor 26. A support beam between two lateral arms of respective trusses 48 may thereby provide additional support or rigidity to the platform 20 construction. The tangs 46 and posts 50 may have respective holes 60, 62 through which pins or bolts 66 can be inserted to mount the service platform 20 to the nacelle 14. In embodiments, the tangs 46 may be in the form of so-called corner castings, e.g. ISO type corner castings. The posts 50 may also be provided with corresponding corner castings or the posts 50 may be provided such that they are connectable to corner castings. For example, holes 60 may be corner casting holes, and the posts 50 may be connected to corner casting type tangs 46 using connectors 66 in the form of e.g. ISO type twistlock elements. Accordingly, the connection between the platform 20 and the nacelle 14 could be via corner castings on the nacelle 14, and using twistlock connectors 66 between the nacelle 14 and the platform 20. An electrical outlet 70 may be provided, e.g. mounted on the rear wall 32 of the nacelle 14, to provide a source of electrical power accessible to the service platform 20.

FIG. 4A illustrates an example of a service platform 20 prior to assembly onto the nacelle 14. FIG. 4B illustrates a service platform 20 after assembly onto the nacelle 14. As illustrated, the service platform 20 is preferably assembled onto the nacelle 14 after the nacelle 14 is installed on the tower 12 at the installation site. However, it will be appreciated that the service platform 20 could just as well be assembled onto the nacelle 14 on the ground, first, and then the assembly of nacelle 14 and service platform 20 could be lifted up and installed, as a single unit, on the tower 12 at the installation site. Techniques for lifting the various wind turbine generator components, to include nacelle 14, rotor hub 16, rotor blades 18, gearbox, transformer, main shaft, main shaft bearing, etc., for assembly onto the tower 12 are well known to those skilled in the art and include the use of air ships, cranes (including self-hoisting cranes), helicopters, and the like.

Figure 3A:
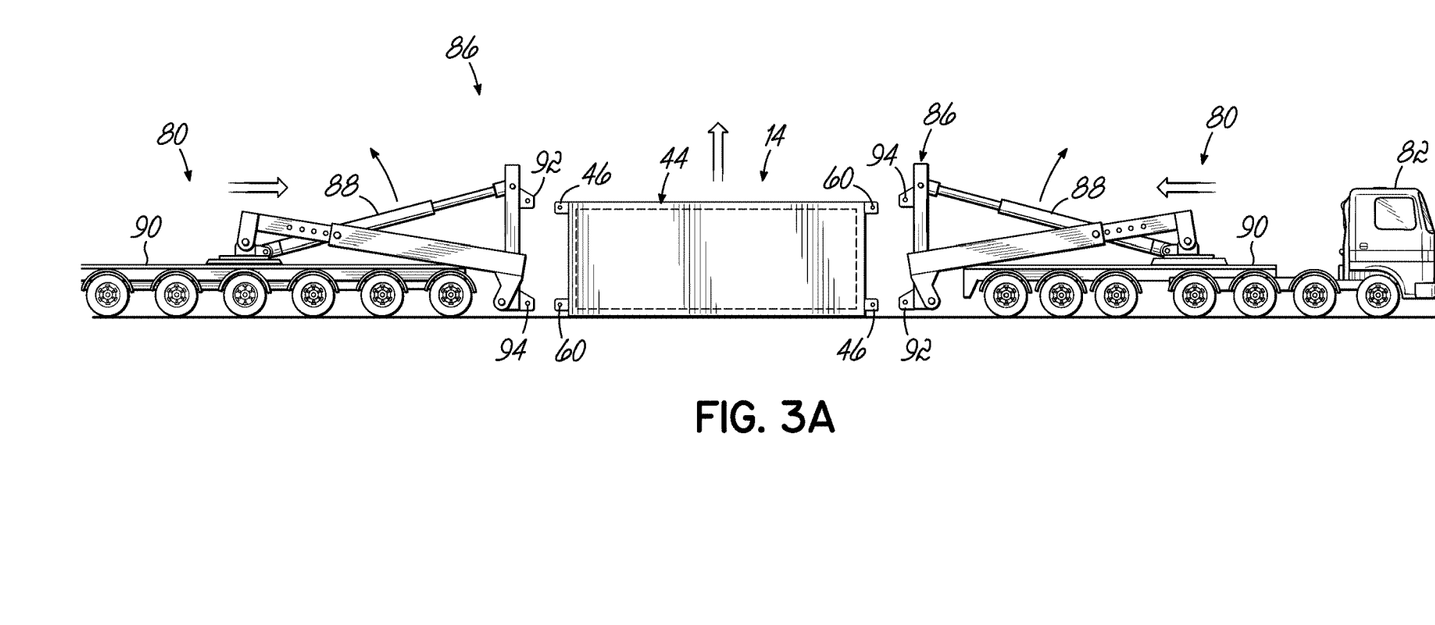
FIG. 3A is a side view of an initial step in transporting the nacelle of the present invention.
Figure 3B:
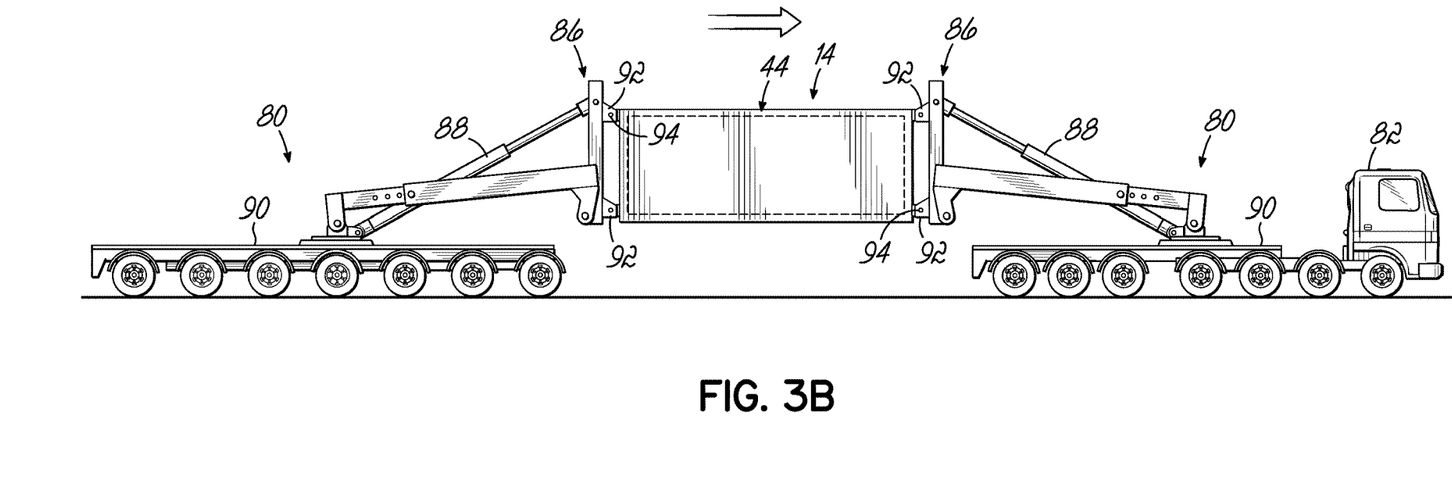
FIG. 3B is a side view of a subsequent step in transporting the nacelle of the present invention.

Referring now to FIGS. 3A and 3B, and in conjunction with the prior description of FIGS. 1, 2, 4A, and 4B, it will be seen that the dedicated fittings, for example tangs, ears, or lugs 46 on the nacelle 14 serve a dual purpose: one, to attach the nacelle 14 (utilizing the tangs 46 on the forward and aft ends of the nacelle 14) to first and second transport trailers 80 towed by tow vehicle 82, and two, to attach the service platform 20 to the nacelle 14 (utilizing the tangs 46 on the aft end of the nacelle 14). The fittings 46 or tangs 46 may thus be referred to as nacelle transport tangs 46. More particularly, each transport trailer 80 includes a transport frame 86 raiseable and lowerable via a lifter, for example hydraulic cylinder 88, operable between the transport frame 86 and a bed 90 of the transport trailer 80. Each transport frame 86 includes fittings, for example tangs, ears, or lugs 92 each with a hole 94 therethrough that, when aligned with holes 60 in tangs 46 on a respective end of the nacelle 14, can accept connectors 66 e.g. in the form of pins or bolts to secure the nacelle 14 to the transport trailers 80. Once so secured (FIG. 3A), the lifters 88 can be energized to lift the nacelle 14 up off the ground or up off a supporting structure, for transport to the installation site (FIG. 3B). Additional details of a similar transport solution can be seen with reference to the assignee's U.S. Pat. No. 7,775,753, hereby incorporated by reference herein as if fully set forth in its entirety. In contrast to previously suggested transport methods or nacelles, the present disclosure envisages dual-purpose transport tangs 46 which, after transportation and delivery of a nacelle 14, e.g. to a construction site, using the transport tangs 46, are subsequently used as connection and support tangs 46 for a service platform 20 of the nacelle 14. Therefore, according to method aspects of the present disclosure, it is envisaged to transport a nacelle 14 between two trailers 80 each equipped with a transport frame 86 on which the nacelle 14 is supported by its transport tangs 46. Thereafter,—e.g. following delivery of the nacelle 14 to a delivery site, which may preferably or optionally be a wind turbine construction site—the nacelle 14 is disconnected from the transport trailers 80 and transport frames 86. Following this, the support trusses 48 of a service platform 20 are connected to the transport tangs 46 which are aft of the nacelle 14. The trusses 48 form a cantilever arrangement by which the platform 20 is supported. When in position at a nacelle 14, the service platform 20 is thereby supported primarily on the transport fittings 46 of the nacelle 14.

Figure 5:
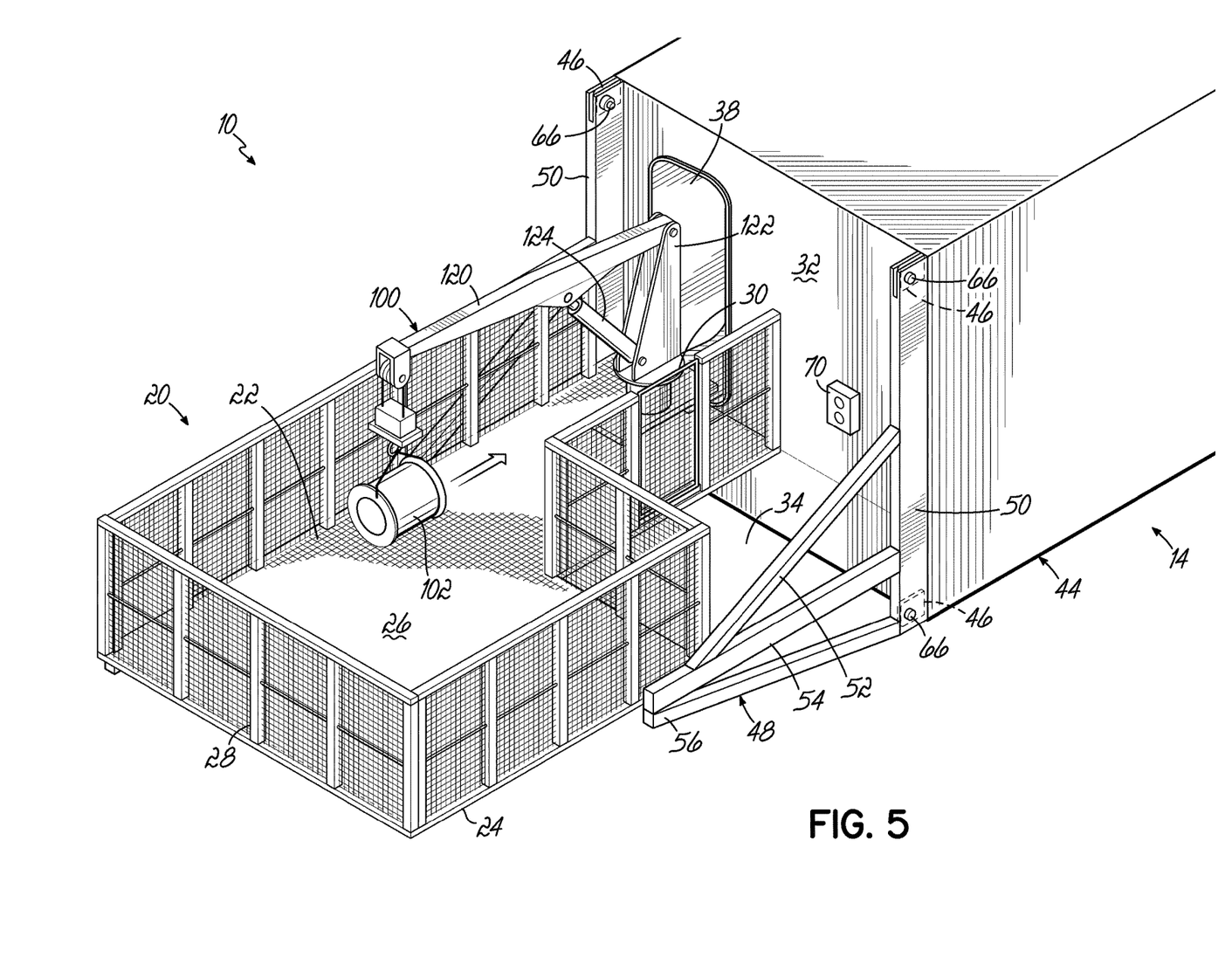
FIG. 5 is a view similar to FIG. 4B illustrating use of a hoist configured to extend through an access door in the rear wall of the nacelle to transfer a load horizontally from the service platform into the nacelle.
Figure 6:
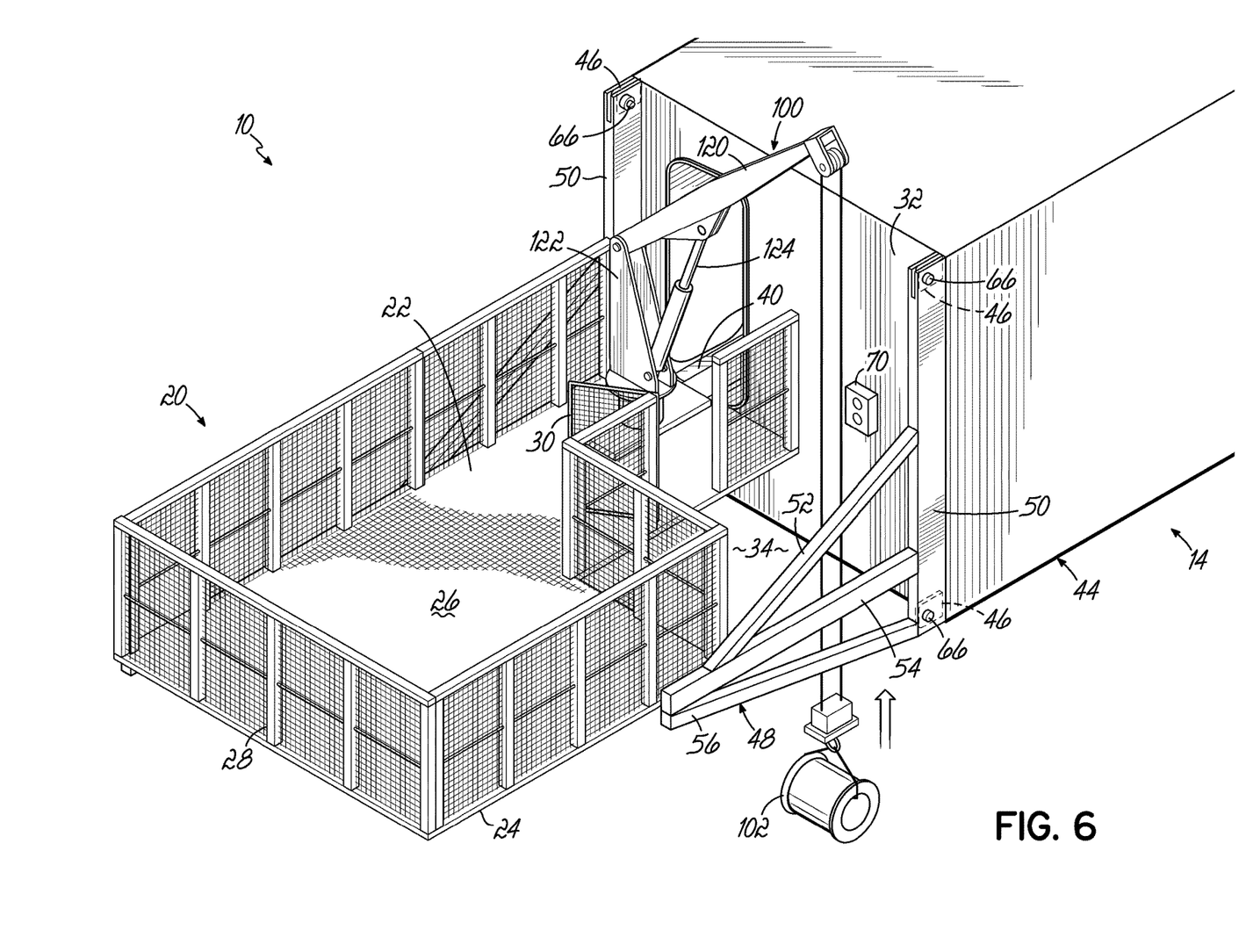
FIG. 6 is a view similar to FIG. 5 illustrating the hoist being slewed to transfer a load vertically from the ground upwardly between a foot portion of the service platform and the rear wall of the nacelle.

Referring now to FIGS. 5 and 6, the nacelle 14 can include a hoist 100. The hoist 100 may be configured to extend through the access door 38 in the rear wall 32 of the nacelle 14. The hoist 100 can thereby be used to transfer a load 102 horizontally from the service platform 20 into the nacelle 14 (FIG. 5). The hoist 100 can also be configured to be slewed such that a load 102 can be transferred vertically upwardly from the ground. The load 102 can for example be brought up through the open area 34 between the foot portion of the service platform 20 and the rear wall 32 of the nacelle. Once the load 102 has cleared the level of the floor 26, the load 102 can be transferred horizontally, e.g. through the gate 30 in the mesh railing 28, onto the floor 26. To accomplish these manoeuvres, the hoist 100 can have a hoist arm 120 pivotally connected to a hoist base 122, and a lifter, for example a hydraulic cylinder 124, operable between the hoist arm 120 and the hoist base 122. The base 122 can be pivotable about a generally vertical axis to provide the slewing motion. Various means 126 known to those skilled in the art can be utilized to provide movement of the hoist 100 out of the nacelle 14 onto the service platform 20, such as rails, tracks, sliding or rolling floor sections, and the like.

In another aspect of the present invention, the service platform 20 can also function as a convenient emergency evacuation platform in the event that workers need to rapidly egress from the nacelle 14 for rescue by air ship, crane, helicopter, or the like. For example, should a fire or other event occur in the nacelle 14 that requires a quick evacuation of personnel, the access door 38 in the rear wall 32 may be opened such that personnel can escape to the service platform 20. In addition to being evacuated from the service platform by air, the service platform 20 may contain other equipment, such as various chutes or escape pods (not shown), that allow personnel to evacuate from the nacelle 14 to the ground or platform adjacent the base of the tower 12.

The nacelle and service platform of the present invention thus conveniently permit personnel and equipment to be either vertically lifted or lowered onto the service platform and then transferred horizontally from the service platform into the nacelle via the door in the rear wall of the nacelle. Personnel and equipment can be placed on the service platform with air ships, cranes (including self-hoisting cranes), helicopters, etc. The equipment can then be transferred horizontally from the service platform through the door in the rear wall of the nacelle and into the nacelle via the nacelle hoist. Personnel can simply walk from the service platform through the door in the rear wall of the nacelle and into the nacelle. Personnel and equipment are thus not required to be lowered down into the nacelle through a hatch in the top of the nacelle. And, the dedicated fittings of the nacelle or nacelle frame provide a convenient means of both transporting the nacelle as well as mounting the service platform on the nacelle.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. For example, instead of the service platform being L-shaped to define an open space for transporting equipment to/from the nacelle, the service platform may be generally rectangular, and a selectively openable/closable hatch or door may be provided in the service platform to facilitate the transport of equipment to or from the nacelle. The invention in its broader aspects is therefore not limited to the specific details and representative apparatus and methods shown and described. The invention resides in each individual feature described herein, alone, and in all combinations of any and all of those features. Departures may therefore be made from such details without departing from the spirit or scope of the general inventive concept. Accordingly, the scope of the invention shall be limited only by the following claims and their equivalents.

The invention claimed is:

1. A nacelle of a wind turbine generator, comprising:
   a nacelle frame having a first forward hub end and a second aft end;
   dedicated transport fittings at each of said ends of said nacelle frame, said fittings adapted to be engaged by transport frames on first and second transport trailers for supporting said nacelle frame for transport by the trailers; and
   a service platform mounted to said transport fittings on said aft end of said nacelle frame such that said service platform is cantilevered off of said aft end of said nacelle frame,
   wherein said nacelle includes an internal service floor and wherein a floor of said service platform is coplanar with said internal service floor.

2. The nacelle of claim 1, wherein the floor of said service platform is generally L-shaped having a leg portion and a foot portion, said leg portion abutting a rear wall of said nacelle and said foot portion spaced away from said rear wall of said nacelle.

3. The nacelle of claim 2, wherein said rear wall of said nacelle has an access door therein positioned to communicate between said service platform and said internal service floor of said nacelle, preferably wherein said service platform functions as an emergency evacuation platform.

4. The nacelle of claim 3, further comprising a hoist configured to extend through said access door out of said nacelle and configured to be slewed so as to be capable of transferring loads horizontally from said service platform to said nacelle and vertically from a support surface upwardly between said foot portion of said service platform and said rear wall of said nacelle.

5. The nacelle of claim 1, wherein said platform includes a pair of trusses each of which has an upright post and a lateral arm, wherein said upright post is supportingly connected to said transport fittings and wherein said lateral arms extend away from said nacelle, the platform being thereby supported by said trusses connected to and supported by said transport fittings.

6. The nacelle of claim 1, wherein said second aft end of said nacelle frame has an electrical outlet accessible from said service platform.

7. A wind turbine generator, comprising:
a tower;
the nacelle according to claim 1 mounted atop said tower;
a rotor hub rotatably supported by said nacelle on said first forward hub end; and
a plurality of rotor blades mounted to said rotor hub.

8. A method of transporting a nacelle of a wind turbine generator to an installation site and configuring it for use at the installation site, comprising:
providing the nacelle having a nacelle frame having a first forward hub end and a second aft end;
providing dedicated transport fittings at each of the ends of the nacelle frame;
engaging the transport fittings on the first forward hub end of the nacelle frame with a first transport frame on a first transport trailer and engaging the transport fittings on the second aft end of the nacelle frame with a second transport frame on a second transport trailer;
supporting the nacelle above the ground with the first and second transport trailers;
transporting the nacelle to the installation site with the first and second transport trailers;
removing the nacelle from the first and second transport trailers; and
mounting a service platform to the transport fittings on the second aft end of the nacelle frame such that the service platform is cantilevered off of the second aft end of the nacelle frame,
wherein the nacelle includes an internal service floor and wherein a floor of said the service platform is coplanar with the internal service floor.

9. The method of claim 8, wherein the floor of the service platform is generally L-shaped having a leg portion and a foot portion, the leg portion abutting a rear wall of the nacelle and the foot portion spaced away from the rear wall of the nacelle.

10. The method of claim 9, wherein the rear wall of the nacelle has an access door therein positioned to communicate between the service platform and the internal service floor of the nacelle, preferably wherein the service platform functions as an emergency evacuation platform.

11. The method of claim 10, further comprising a hoist configured to extend through the access door out of the nacelle and configured to be slewed so as to be capable of transferring loads horizontally from the service platform to the nacelle and vertically from a support surface upwardly between the foot portion of the service platform and the rear wall of the nacelle.

12. The method of claim 8, wherein said platform includes a pair of trusses each of which has an upright post and a lateral arm, wherein said upright post is supportingly connected to said transport fittings and wherein said lateral arms extend away from said nacelle, the platform being thereby supported by said trusses connected to and supported by said transport fittings.

13. The method of claim 8, wherein the second aft end of the nacelle frame has an electrical outlet accessible from the service platform.

* * * * *